Figure 1:
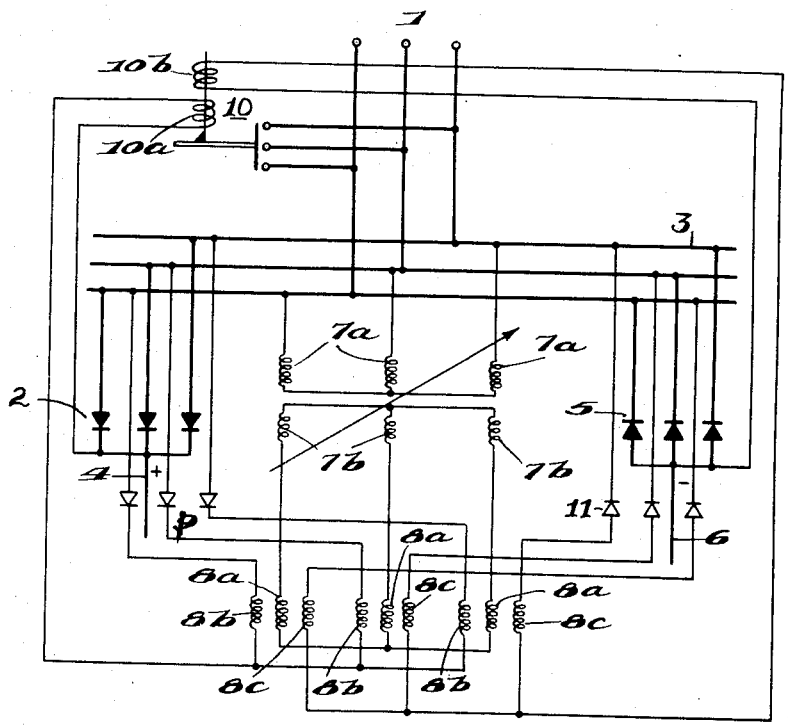

Sept. 8, 1959  A. BRANDT  2,903,637
ARRANGEMENT FOR PREVENTING BACKFIRE IN ELECTRICAL RECTIFIERS
Filed Sept. 3, 1958

INVENTOR
Armand Brandt

BY Pierce, Scheffler & Parker
ATTORNEYS

United States Patent Office 2,903,637
Patented Sept. 8, 1959

---

2,903,637

ARRANGEMENT FOR PREVENTING BACKFIRE IN ELECTRICAL RECTIFIERS

Armand Brandt, Wettingen, Switzerland, assignor to Aktiengesellschaft Brown, Boveri & Cie, Baden, Switzerland, a joint-stock company Application September 3, 1958, Serial No. 758,795

Claims priority, application Switzerland September 6, 1957

6 Claims. (Cl. 321—12)

The present invention relates to electrical converter or rectifier systems for converting alternating current into direct current in order to supply a direct current load from an alternating current supply source, and more particularly to an improved arrangement for protecting such rectifier or converter systems in the event that backfiring occurs.

It is well known that backfiring in converter systems jeopardizes not only the defective converters themselves in which the backfiring occurs but also impairs operation of the other defect-free converters in the system connected in parallel with the one which backfires, because of the overcurrents which are produced in the defect-free converters. Converters of the semi-conductor type are especially sensitive to overcurrents and means must be provided to disconnect them as quickly as possible in the event of a backfire.

Various expedients have been proposed to protect these converter systems, particularly those employing semi-conductor type rectifiers, against overcurrents which are formed by return current. It is possible to use safety fuses which have a very short disconnecting time in the event of high current, and which frequently melt even before the current limiting values have been reached. Semiconductor rectifiers are used in systems for producing very high direct currents, for example, 10,000 amperes, or more. This is achieved by connecting a plurality of the rectifiers in parallel. Each parallel circuit is then provided with a fuse of the type mentioned. However, for very high current loads which would necessitate placing a large number of semi-conductor type rectifiers in parallel, it is self-evident that the correspondingly large number of protective fuses required respectively for protection of the individual rectifier elements against backfire would be most expensive and hence economically unfeasible.

It has been suggested for converter systems, particularly those utilizing mechanical rectifiers of the contact type wherein the contact is periodically opened and closed in synchronism with the wave form of the alternating current supply source, to provide return current converters in the anode feeds which actuate short-circuiting devices operating at extremely high speed. To such end, converters are used which are not effective in the normal direction of flow of the load current but which produce voltages in the secondary winding in the case of return i.e. backfire currents, which actuate the short-circuiting devices. Such a device is not applicable, however, to converter systems employing semi-conductor type rectifiers because short return current peaks appear there following the overlapping of the current, i.e. the commutation from one phase to another. But there must be no disconnection in this case. It would therefore be necessary to increase the releasing time of the short-circuiting device so far as the return currents can flow following the overlapping time. But this could already cause an overload of the rectifier elements in the case of defects.

The foregoing disadvantages are eliminated by the present invention which makes it possible, by means which are more simple and less expensive to produce, to ensure a rapid disconnection of the rectifiers in the system should any backfiring take place.

The inventive concept, as more particularly defined in the appended claims, resides in the application of pulses to the various converter elements in the system, during the blocking time of such elements, i.e. during the time the rectifier element is not conducting current, at least once during the cycle of the alternating current applied to such element, this pulse being effective to actuate a protective device in case it is transmitted by the rectifier element to cause the rectifiers to be disconnected from their source of supply of the alternating current.

The improved arrangement avoids the necessity for using means which depend upon the main currents flowing through the rectifier elements. It is thus independent of the amount of current passing through the rectifiers from the alternating current supply source to the direct current load. As a characteristic for the response of the protective device there is used the blocking property inherent in the rectifier element itself. This device is not even influenced by return current peaks occurring normally following the overlapping, since the pulses are sent over the rectifier elements during their blocking time. The pulses are not transmitted by the rectifier elements which are operating in a normal defect-free manner so no current is generated. However, if one rectifier element should become defective, it becomes transmissive to current. In such case, a current pulse is generated which is then used to actuate a protective device, for example, a short-circuiting device, and which protects in a fraction of a cycle of the alternating current, those other rectifier elements in the system that would be endangered by overcurrents. If desired, the protective device set into operation by transmission of the pulse through the defective rectifier element, can be made to act upon a voltage regulator used with the system in such manner that current flow in the system is limited. The short-circuiting device can short-circuit the feed for the rectifier so that the protective device responds to the feeding side of the rectifiers while at the same time the fault currents are kept away from the rectifier elements.

In accordance with the invention, the pulses used to test each rectifier element at least once during the alternating current cycle are generated by means of auxiliary rectifiers. The voltage from the alternating current supply mains is fed to these auxiliary rectifiers by means of a phase-changing transformer in order that the period during which these rectifiers are conductive occurs during the period that the main current flow through the main rectifier elements is blocked.

Figure 2:
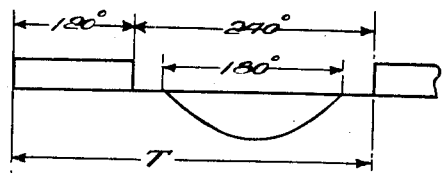

One practical embodiment of the invention will now be described in detail and is illustrated in the accompanying drawings. In these drawings:

Fig. 1 is an electrical schematic diagram showing one known type of rectifier system using main rectifier elements of the semi-conductor type and which is provided with the improved protective system including auxiliary rectifiers also of the semi-conductor type which provide pulses for testing each of the main rectifier elements during a considerable portion of the blocking time of the latter; and Fig. 2 is a graphic illustration of the time period in which each rectifier element is tested in each cycle of the applied alternating current.

With reference now to Fig. 2, the rectifier system comprises a source of alternating current indicated by the 3-phase supply mains 1 in which are connected, in the usual manner two sets of rectifiers of the semi-conductor type. One set 2 of these rectifiers are connected at their input sides respectively to the respective phases of the alternating current distribution supply line 3 fed from the mains 1, and all of said rectifiers are connected together at their output sides to the positive or + conductor 4 which supplies the direct current load; the other set of rectifiers 5 are connected at their output sides respectively to the respective phases of the alternating current supply line 3 and all of said rectifiers are connected together at their input sides to the negative or — conductor 6 connected to the direct current load. Current flows from the three phase supply line 3 through the rectifiers 2 in succession and through the direct current load, not illustrated, and thence back to the line 3 through the other set of rectifiers 5 in succession.

The pulse generator in accordance with the present invention is comprised of an adjustable phase transformer 7 having its three primary windings 7a connected to the respective phases of the supply line 3. The three secondary windings 7b are connected as shown and arranged to feed three other windings 8a. Inductively related to the three windings 8a are three windings 8b which are connected respectively from one terminal thereof in series with three auxiliary rectifiers 9 of the semi-conductor type and which are respectively connected to the three different phases of the alternating current supply line 3. Rectifiers 9 are poled in the same direction as the main rectifiers 2. The other terminals of windings 8b are interconnected and extend to one terminal of one control winding 10a of a short-circuiting device 10 which operates to place a short circuit across the three phases of the alternating current supply source. The other terminal of control winding 10a is connected to the positive conductor 4 of the direct current load. Thus each of the auxiliary rectifiers 9 forms with the voltage generated in winding 8b with which it is series associated a pulse circuit capable only during the respective blocking times or periods of the main rectifiers 2 due to the phase change in transformer 4 of sending a pulse of current through the control winding 10a to actuate the short-circuiting device 10, but only only in the event that one of such rectifiers 2 should become defective and start to backfire.

In a similar manner, three other windings 8c are inductively related to windings 8a which are connected respectively from one terminal thereof in series with another set of three auxiliary rectifiers 11 of the semi-conductor type and which are respectively connected to the three different phases of the alternating current supply 3. Rectifiers 11 are poled in the same direction as the main rectifiers 5. The other terminals of windings 8c are interconnected and extend to one terminal of another control winding 10b of the short-circuiting device 10. The other terminal of control winding 10b is connected to the negative conductor 6 of the direct current load. Thus each of the auxiliary rectifiers 11 forms with the voltage generated in winding 8c with which it is associated a pulse circuit capable only during the blocking periods of the main rectifiers 5 due to the phase change in transformer 4 of sending a pulse of current through the control winding 10b to actuate the short-circuiting device 10, but only in the event that one of such main rectifiers 5 should become defective.

In the event that any of the main rectifiers 2 or 5 become defective and hence result in current flow from the pulse generator to the control winding 10a or 10b, the short-circuiting device 10 will be actuated to place a short circuit across the supply mains 1 thus starting a short circuit in the latter and which results in an actuation of a circuit breaker, not shown, that removes the power supply from the mains 1. This disconnects the power rectifier sets 2 and 5 from their source of supply voltage so that no defective, return current can be generated.

In lieu of the short-circuiting device 10, the same protective result can be obtained by use of separate relays associated with a different type of protective device such as a switch which would itself disconnect the rectifier sets 2 and 5 from the distribution lines 3.

Fig. 2 illustrates the manner in which the protective system operates for the three phase converter system illustrated in Fig. 1.

In the case of three-phase rectifier systems, no current flows over each one of the main rectifier elements for a period corresponding to 240° of the alternating current cycle T. That is, each main rectifier 2 and 5 conducts for 120° and is "blocked" for 240°. The auxiliary rectifiers 9 and 11 do not transmit any current beyond a period of 180°. This transmission range of the auxiliary rectifiers is placed, by means of a suitable phase displacement with transformer 7, into the blocking range of the main rectifier elements 2 and 5 and it will thus be evident that each main rectifier element is tested for a period of about 180° of the total 240° during which current flow through each main rectifier element is blocked. There is no testing during the overlapping time, so that the protective device in accordance with the inventive concept cannot respond falsely during this time.

In conclusion, while the rectifier protective system which has been disclosed is intended particularly for use with rectifiers of the semi-conductor type which are highly sensitive to overcurrents, it can also be used with rectifiers or converters of other types such as the mechanical contactor.

I claim:

1. In an electrical converter system comprising rectifier means connected between an alternating current supply source and a direct current load, an arrangement for protecting said system in the event of rectifier backfire comprising means for generating a pulse during the blocking period of said rectifier means and circuit means applying said pulse to said rectifier means, said circuit means including an electrically responsive protective device effective when energized by transmission of said pulse to disconnect said rectifier means, transmission of said pulse being effected only in the event of backfire of said rectifier means.

2. The invention as defined in claim 1 wherein said pulse generating means includes an auxiliary rectifier means in circuit with a displaceable phase transformer connected to said alternating current supply source.

3. The invention defined in claim 1 wherein said protective device is constituted by a device which places a short circuit across said alternating current supply source.

4. The invention as defined in claim 1 wherein said protective device is constituted by a relay effective to reduce the voltage applied to said rectifier means from said alternating current supply source.

5. The invention as defined in claim 1 wherein said rectifier means are of the grid-controlled type and said protective device is connected to exert a blocking effect on the control of said rectifier grid.

6. In an electrical converter system operating to supply a direct current load from three phase means, a first set of three main rectifiers poled in one direction and connected respectively between the three phases of said mains and the positive conductor of said load, a second set of three main rectifiers poled in the opposite direction and connected respectively between the three phases of said mains and the negative conductor of said load, a displaceable phase three phase transformer having its primary windings connected respectively to the three phases of said mains, a first set of auxiliary rectifiers poled in the same direction as that of said first set of main rectifiers, means connecting one side of said auxiliary rectifiers of said first set respectively to the three phases of said mains, means connecting the other sides of said auxiliary rectifiers of said first set to corresponding windings at the secondary side of said transformer and from the latter through a control winding of a protective device effective to disconnect said main rectifiers and thence to said positive conductor of said load whereby test pulses are applied respectively to the main rectifiers of said first set during their respective blocking times, a second set of auxiliary rectifiers poled in the same direction as that of said second set of main rectifiers, means connecting one side of said auxiliary rectifiers of said second set respectively to the three phases of said mains, means connecting the other sides of said auxiliary rectifiers of said second set to corresponding windings at the secondary side of said transformer and from the latter through another control winding of said protective device effective to disconnect said main rectifiers and thence to said negative conductor of said load whereby test pulses are applied respectively to the main rectifiers of said second set during their respective blocking times.

References Cited in the file of this patent

UNITED STATES PATENTS

| | | |
|---|---|---|
| 2,672,584 | Rolf | Mar. 16, 1954 |
| 2,677,092 | Schmidt | Apr. 27, 1954 |
| 2,684,461 | Busemann | July 20, 1954 |